UNITED STATES PATENT OFFICE.

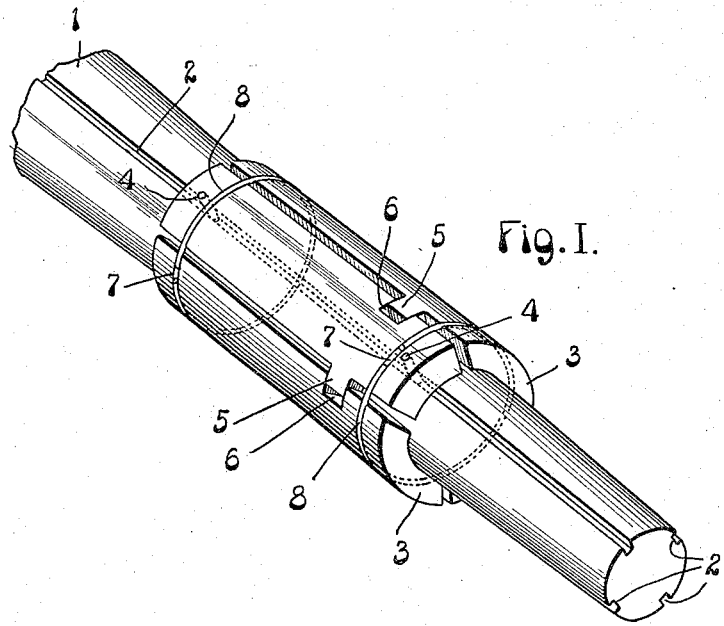
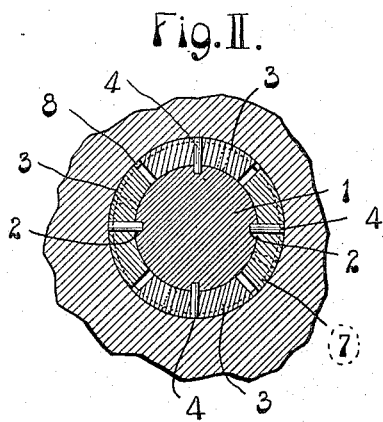
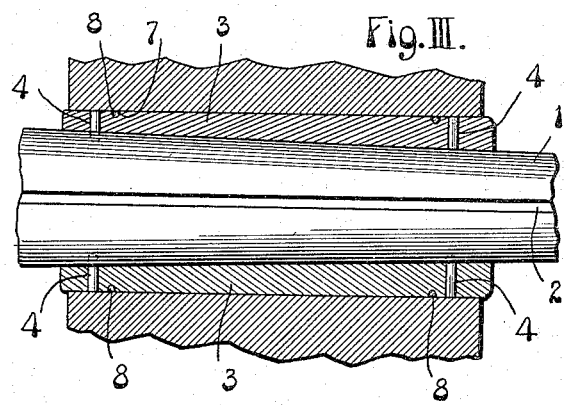
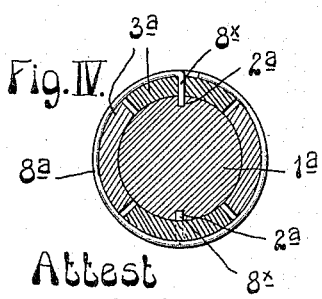

JOHN ENOCH, OF SPRINGFIELD, OHIO, ASSIGNOR TO THE WESTERN TOOL & MANUFACTURING COMPANY, OF SPRINGFIELD, OHIO, A CORPORATION OF OHIO.

EXPANDING MANDREL.

1,168,794.  Specification of Letters Patent.  Patented Jan. 18, 1916.

Application filed April 4, 1912. Serial No. 688,427.

*To all whom it may concern:*

Be it known that I, JOHN ENOCH, a citizen of the United States of America, and a resident of the city of Springfield, in the county of Clark and the State of Ohio, have invented certain new and useful Improvements in Expanding Mandrels, of which the following is a full, clear, and exact description, reference being had to the accompanying drawings, forming a part of this specification.

My invention relates to an expanding mandrel suitable for use in lathes and other machine shop appliances, and it has for one of its objects to provide a mandrel of this kind comprising an arbor and a sectional sleeve expansible by the arbor, with the parts so fitted to each other as to necessitate the sleeve sections remaining constantly parallel to each other, with the result of causing all of the sections to be adjusted radially with accuracy to the wall of the bore in which the mandrel is fitted.

Another object of my invention is to provide means whereby the sections of the sleeve are prevented from turning on the mandrel.

A further object of my invention is to provide the sleeve sections of an expansible mandrel with adequate means for preventing longitudinal displacement of either of the sleeve sections relative to the other sections.

Figure I is a perspective view of my expansible mandrel. Fig. II is a cross section of the mandrel expanded within a fragment of an object to which it is fitted. Fig. III is a view showing the arbor of the mandrel in elevation, and the expansible sleeve in section expanded within an object to which the arbor is fitted. Fig. IV is a cross section of a modified form of mandrel.

In the drawings: 1 designates a tapering arbor provided with a plurality of grooves 2 that extend longitudinally of the arbor and are preferably equidistant from each other.

3 designates segments of an expansible sleeve, the segments being of such width and form that when they are combined together in the sleeve and their side edges are in contact, the sleeve will fit closely to the arbor 1 while it is upon the smaller portion of said arbor, without the sleeve being expanded to any degree. When the arbor is forced through the expansible sleeve, said segments are separated more or less from each other, according to the degree of movement of the arbor in the sleeve to position larger diameter portions thereinto. The inner faces of the sleeve segments are beveled in conformity to the taper of the arbor and the outer faces of the segments are so formed that the sleeve is of the same external diameter throughout its length, to fit a straight bore through any object in which the mandrel is placed and secured by the expansion of its sleeve. Each sleeve segment 3 is provided near its ends with pins 4 that extend beyond the inner face of the segment and are adapted to ride in one of the longitudinal grooves 2 in the arbor 1. These pins serve to hold the segments absolutely in alinement with the axis of the arbor, when the arbor is forced into the sleeve and, therefore, prevent the segments from movement into positions diagonally relative to such axis to the detriment of their seating accurately against the wall of a hole or bore in which the mandrel is fitted, as they should in obtaining a proper frictional connection of the mandrel to such object. Furthermore, the pins act to prevent rotation of the arbor within the expansible sleeve, or turning of the sleeve on said arbor.

5 designates tongues extending from the side edges of the expansible sleeve segments, and 6 are notches in such segments with which the tongues match to hold the segments to prevent independent longitudinal movement of any segment relative to the other segments. The tongues 5 are integral with the segments that carry them, and of the same thickness as the segments and each of said tongues is non-circular in shape. The notches 6 extend the full thickness of the segments containing them, and correspond in shape to the shape of the tongues which enter thereinto. By thus making said tongues and grooves I provide very strong slip joints between the segments, the tongues of such joints being capable of withstanding all of the strain there is any possibility of their being subjected to in the act of forcing the arbor into the expansible sleeve of my mandrel.

The expansible sleeve segments are provided with transverse grooves 7, which these grooves receive the spring binding match together in a complete circle, and rings 8, which serve to hold the sleeve segments assembled and permit the expansion and contraction of the sleeve when the mandrel is being fitted to and removed from an object into which it is placed.

In Fig. IV I have shown a modification, in which the expansible sleeve segments 3ª are provided with holes extending therethrough and the spring retaining rings 8ª are provided with terminal inturned ends extending through the holes in the segments and into longitudinal grooves 2ª in the arbor 1ª. The inturned ends of the retaining rings serve to perform the same office as is performed by the pins 4 in the first described construction.

I claim:—

In an expanding mandrel, a tapered arbor, an expansible sleeve on said arbor comprising a plurality of segments, provided at their side edges with matching tongues and notches for holding the segments from endwise movement relative to each other, and a pair of spring binding rings encircling said sleeve, each of said segments being provided with a pair of grooves in its outer face for the reception of said spring binding rings, and one of said spring binding rings being provided with an inturned end portion which extends entirely through one of said segments and projects from the inner face of the latter.

JOHN ENOCH.

In the presence of—
ROBERT J. SAUM,
PERRY A. ZIMMERMAN.

Copies of this patent may be obtained for five cents each, by addressing the "Commissioner of Patents, Washington, D. C."